(12) United States Patent
Villars

(10) Patent No.: US 11,061,553 B1
(45) Date of Patent: Jul. 13, 2021

(54) DRAG AND DROP QUICK ACTIONS

(71) Applicant: Dropbox, Inc., San Francisco, CA (US)

(72) Inventor: Spencer Villars, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/135,148

(22) Filed: Dec. 28, 2020

(51) Int. Cl.
| | | |
|---|---|---|
| *G06F 3/0486* | (2013.01) | |
| *G06F 3/0481* | (2013.01) | |
| *G06F 3/0488* | (2013.01) | |
| *G06F 3/0482* | (2013.01) | |

(52) U.S. Cl.
CPC .......... *G06F 3/0486* (2013.01); *G06F 3/0482* (2013.01); *G06F 3/04812* (2013.01); *G06F 3/04817* (2013.01); *G06F 3/04886* (2013.01)

(58) Field of Classification Search
CPC .............. G06F 3/0486; G06F 3/04812; G06F 3/04886; G06F 3/04817; G06F 3/0482; G06F 3/048
See application file for complete search history.

(56) References Cited

U.S. PATENT DOCUMENTS

| | | | |
|---|---|---|---|
| 8,209,622 B2 | 6/2012 | Selig | |
| 9,058,092 B2 | 6/2015 | Rogers | |
| 9,223,483 B2 | 12/2015 | Thorsander et al. | |
| 10,423,705 B2 | 9/2019 | Matsumoto | |
| 10,489,044 B2 | 11/2019 | Cummins et al. | |
| 2008/0034318 A1* | 2/2008 | Louch ................... | G06F 3/0486 715/781 |
| 2012/0233205 A1 | 9/2012 | McDermott | |
| 2015/0121271 A1* | 4/2015 | Huang ................ | G06F 3/04842 715/769 |
| 2017/0147196 A1 | 5/2017 | Matthews et al. | |
| 2017/0192764 A1* | 7/2017 | Cayre ..................... | H04L 67/02 |
| 2017/0357418 A1* | 12/2017 | Dunn ................... | G06F 3/04845 |
| 2018/0285321 A1* | 10/2018 | Antony ................ | G06K 9/6892 |
| 2019/0075143 A1 | 3/2019 | Chai et al. | |
| 2019/0129596 A1* | 5/2019 | Ligameri .............. | G06F 3/0483 |
| 2019/0222632 A1* | 7/2019 | He ....................... | H04L 67/1097 |
| 2020/0034009 A1 | 1/2020 | Sharma et al. | |

OTHER PUBLICATIONS

Pham H. et al., "Cloudtop: a Workspace for the Cloud," retrieved from https://doi.org/10.1145/2046396.2046427, UIST '11 Adjunct: Proceedings of the 24th annual ACM symposium adjunct on User interface software and technology, Oct. 16-19, 2011, pp. 69-70.

* cited by examiner

*Primary Examiner* — Jeanette J Parker
(74) *Attorney, Agent, or Firm* — Polsinelli PC

(57) ABSTRACT

The present technology provide a mechanism for displaying and initiating actions and workflows for objects with a single drag-and-drop operation in association with a content management system. Drag operations may be monitored to trigger monitoring of a pointer performing the drag operation to detect whether the pointer is within a threshold distance from a chosen aspect, such as a system tray icon, and/or an area of a temporary invisible window. Upon detection, the drag operation of the objects may seamlessly trigger a presentation of a menu window. The menu window may display one or more icons representing different actions and workflows for which the object may be dropped, via a drop operation, upon to indicate a selection.

20 Claims, 8 Drawing Sheets

DRAG AND DROP QUICK ACTIONS

TECHNICAL FIELD

The present technology pertains to detecting drag-and-drop operations near a system tray icon, and more particularly, to detect a drag-and-drop operation of one or more objects near a system tray icon to initiate an action associated with a content management system.

BACKGROUND

Performing certain actions on objects, such as adding objects from an external source into a desired destination at a content management system, may require multiple steps. For example, a user may need to open an associated client application, find the desired destination, and then move the objects by dragging and dropping, cutting and pasting, etc. Alternatively, the user may first add the objects to their default user account folder at the content management system. For example, the user could drag-and-drop the objects into an open window for the associated client application. In either example, the associated application would need to be open in order to then move those objects to the desired destination, and no content management system actions can take place on the object until the object is first stored in the content management system. These processes may end up being cumbersome and time-consuming, especially when repeated often. For other common workflow options, such as creating a link to and/or sending the link for an object that has yet to be added to the content management system, even more steps are required.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
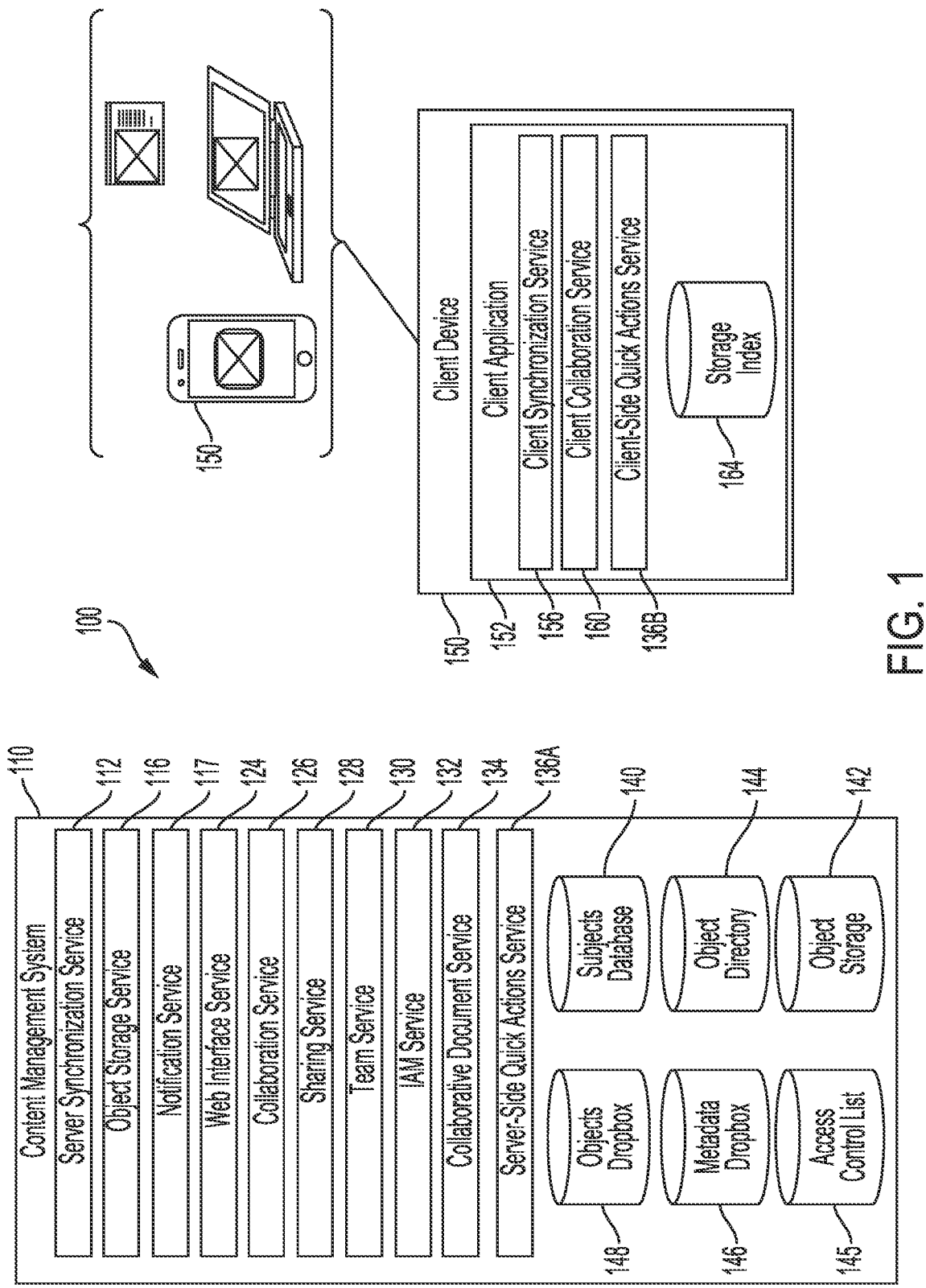
FIG. 1 illustrates an example of a content management system and client devices in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The present technology addresses the need in the art for providing more efficient mechanisms for performing various actions or workflow options to perform on an object (e.g., one or more content items) with a single drag-and-drop operation. For example, choosing one of the workflow options may trigger adding the object from an external source into a selected destination folder at a content management system.

Performing certain actions on objects, such as adding objects from an external source into a desired destination at a content management system, may require multiple steps. For example, a user may need to open an associated client application, find the desired destination, and then move the objects by dragging and dropping, cutting and pasting, etc. Alternatively, the user may first add the objects to their default user account folder at the content management system. For example, the user could drag-and-drop the objects into an open window for the associated client application. In either example, the associated application would need to be open in order to then move those objects to the desired destination, and no content management system actions can take place on the object until the object is first stored in the content management system. These processes may end up being cumbersome and time-consuming, especially when repeated often. For other common workflow options, such as creating a link to and/or sending the link for an object that has yet to be added to the content management system, even more steps are required.

The present technology provides a more efficient mechanism for performing actions leveraging a content management system. Efficiency is provided by utilizing a drag-and-drop mechanism that is available through a system tray, which is often easily accessible to a user from almost any screen or application. Efficiency is also provided by enabling a user to perform the drop portion of the drag-and-drop action at a location that is merely near the system tray and it is not required to finally control the drop of an icon representing an object. Efficiency is further provided because the present invention enables the selection of actions to be performed on an object that is not yet stored in the content management system, whereas prior systems do not make initiating such actions possible until an object is stored in the content management system.

The present technology may provide improvements in mechanisms for monitoring drag operations, such as by incorporating reports of global drag events that may be detected by an operating system at a client device. For example, a report of a global drag operation may be used to trigger monitoring of coordinates of a pointer performing the drag operation on a graphical user interface of the client device. The monitoring of the coordinates may be used to determine whether the pointer is within a threshold distance from a chosen aspect, such as a system tray icon, and/or an area of an invisible window that is temporarily created upon detecting the drag operation. Upon detection that the coordinates are within the threshold distance and/or the area of the temporary invisible window, the drag operation of the object may seamlessly trigger a presentation of a menu window. The menu window may display one or more icons representing different actions and workflows upon which the object may be dropped, to indicate a selection.

The present technology thus addresses current problems in the art by making it easier to display and initiate actions and workflows for objects with a single drag-and-drop operation in association with a content management system. These actions and workflows may be applied to objects that were not originally stored in the content management system when selected for a drag-and-drop operation. Generally, workflows, such as those that require the objects be saved at the content management system first, require multiple action steps. In this way, the present technology reduces each of the multiple action steps, which requires fewer burdens on both a computing system (by needing to navigate to and render fewer interfaces) and a user (by reducing the number of steps they need to perform).

In some embodiments the disclosed technology is deployed in the context of a content management system having object synchronization capabilities and collaboration features, among others. An example system configuration 100 is shown in FIG. 1, which depicts content management system 110 interacting with client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system, and account details can be stored in subject database 140. Subject database 140 can identify a registered subject by a subject ID, and store profile information for registered subjects in association with the subject ID. In some cases, profile information for registered subjects includes a subject name and/or email address. Subject database 140 can include account management information, such as account type (e.g. various tiers of free or paid accounts), storage space allocated, storage space used, client devices 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 140 need not store complete information associated with an account for a subject. Some portion of information associated with an account for a subject can also be stored in another database of content management system 110 such as metadata database 146, or in a database external to content management system 110.

Subject database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 110 or in other content management systems, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in object directory 144. Additionally, data regarding changes, access, etc. can be stored in objects database 148. Objects database 148 can also include a subject account identifier that identifies the subject IDs that have access to the object.

In some embodiments, objects database 148 can be broken into a plurality of tables, indexes and other data structures.

Each of the various storages/databases such as object storage 142, object directory 144, objects database 148, and metadata database 146 can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a parent of an object or a content path for an object in objects database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 142 in blocks and may not be stored under a tree like directory structure, such directory structure is a comfortable navigation structure for subjects viewing objects. Object storage service 116 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 142.

While the directory structure in which an account views objects does not correlate to storage locations of the objects at content management system 110, the directory structure can correlate to storage locations of the objects on client device 150 depending on the file system used by client device 150.

As addressed above, a content entry in object directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

Object storage service 116 can also store metadata describing objects, object types, folders, file path, and/or the relationship of objects to various accounts, collections, or groups in metadata database 146, in association with the object ID of the object.

Object storage service 116 can also store a log of data regarding changes, access, etc. in objects database 148. Objects database 148 can include the object ID of the object and can optionally include a description of the change or access action along with a time stamp or version number and any other relevant data. Objects database 148 can also include pointers to blocks affected by the change or object access. Object storage service 116 can also provide the ability to undo operations, by using an object version control mechanism that tracks changes to objects, different versions of objects (including diverging version trees), and a change history that can be acquired from objects database 148.

Object Synchronization

Another feature of content management system 110 is synchronization of objects with at least one client device 150. Client device(s) 150 can take different forms and have different capabilities. For example, client device 150 can be a computing device having a local file system accessible by multiple applications resident thereon. Client device 150 can be a computing device wherein objects are only accessible to a specific application or by permission given by the specific application, and the objects are typically stored either in an application specific space or in the cloud. Client device 150 can be any client device accessing content management system 110 via a web browser and accessing objects via a web interface. While example client device 150 is depicted in form factors such as a laptop, mobile device, or web browser, it should be understood that the descriptions thereof are not limited to devices of these example form factors. For example a mobile device might have a local file system accessible by multiple applications resident thereon, or might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices 150 are associated with an account of content management system 110, but in some embodiments client devices 150 can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the object into blocks, hashing the object to generate a unique identifier, etc. Client synchronization service 156 can index content within client storage index 164 and save the result in client storage index 164. Indexing can include storing paths plus the object identifier, and a unique identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update objects database 148, metadata database 146, object directory 144, object storage 142, subject database 140, etc. as appropriate.

When synchronizing from content management system 110 to client device 150, data regarding a mount, modification, addition, deletion, move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150 all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real time, instant messaging, providing presence and "seen" state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of subject accounts.

To share an object within content management system 110 sharing service 128 can add associate a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed. In some embodiments, objects can inherit access rights from another object such as ancestor objects.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include a token identifying an object ID and optionally a subject ID in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service 130 can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g. a subject account with subject rights and administrator rights) IAM service 132 can also facilitate explicit privilege escalation to avoid unintentional actions by administrators.

Object Access

Object storage service 116 can receive a token from client application 152 that follows a request to access an object and can return the capabilities permitted to the subject account.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notifications service 117 when client device 150 is accessing the object. Notifications service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments content management service can also include collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third Party Services

In some embodiments content management system 110 can include functionality to interface with one or more third party services such as workspace services, email services, task services, etc. In such embodiments, content management system 110 can be provided with login credentials for a subject account at the third party service to interact with the third party service to bring functionality or data from those third party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Quick Actions Service

System 100 can also include quick actions service 136, which may include server-side quick actions service 136A and/or client-side quick actions service 136B, as shown in FIG. 1. FIGS. 2A, 2B, 3A, and 3B illustrate example graphical user interfaces (graphical user interface 200A, 200B, 300A, and 300B, respectively) where a drag operation (e.g., drag operation 202 in FIGS. 2A and 2B) is indicated by a selection and dragging of an object (e.g., content item 204 in FIGS. 2A and 2B) by a pointer (e.g., pointer 206 in FIGS. 2A and 2B). The drag operation may be monitored by quick actions service 136 of FIG. 1.

Figure 2A:
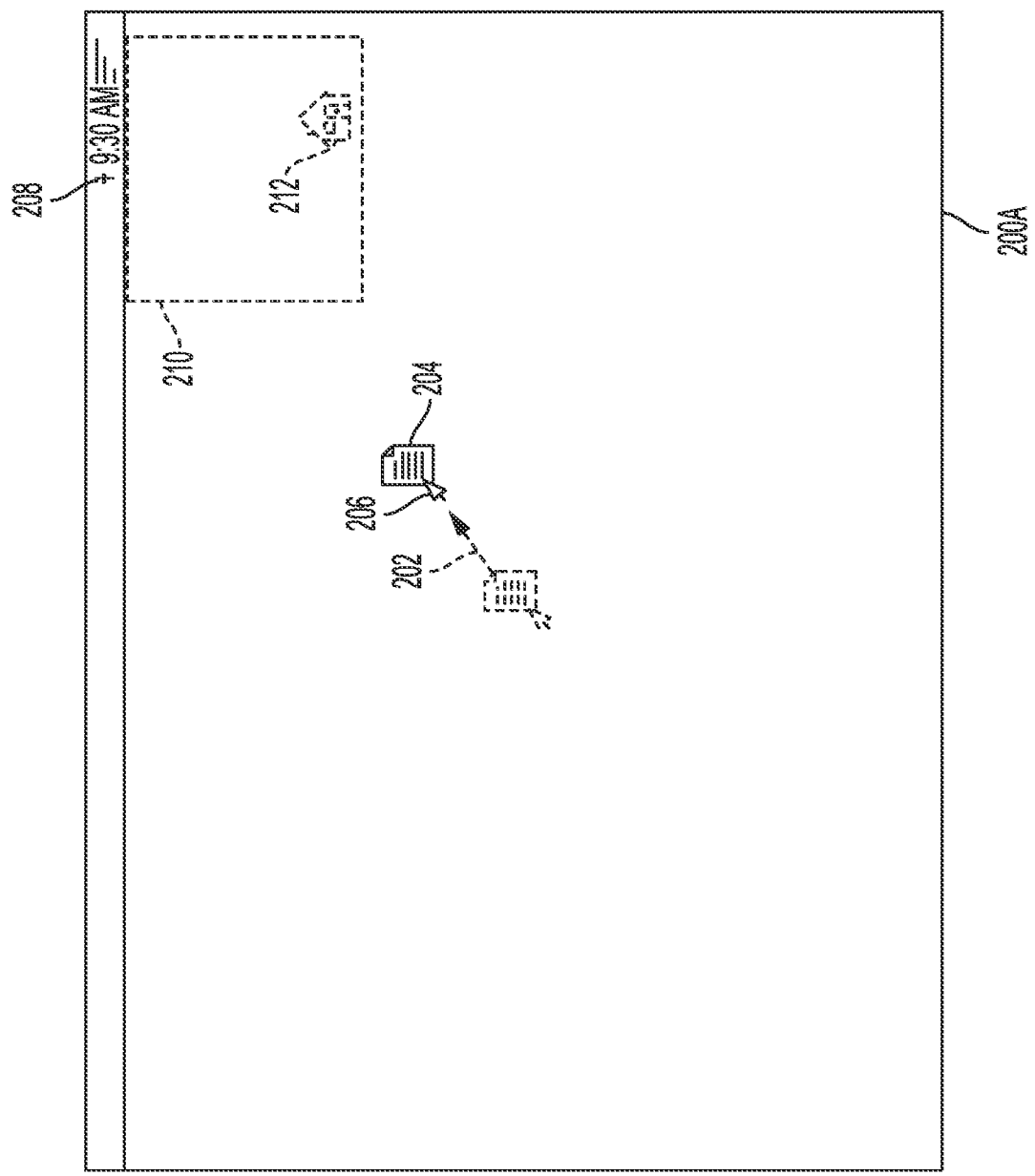
FIG. 2A shows an example user interface where a drag operation is detected, in accordance with some aspects of the present technology.

FIG. 2A shows graphical user interface 200A with content item 204 being selected and dragged (e.g., drag operation 202) by pointer 206. The drag operation 202 includes selecting content item 204 on graphical user interface 200A with the pointer 206 and moving the pointer 206, while still selecting content item 204, such that the content item 204 is being dragged across graphical user interface 200A.

The drag operation may trigger monitoring of coordinates of the pointer on the graphical user interface of client device 150. The monitoring may be with respect to making a determination for when the coordinates come within a threshold distance of a system tray icon (e.g., system tray icon 208) associated with content management system 110. Thus, the listening for the drag operation 202 prevents unnecessarily monitoring of the coordinates of the pointer; the monitoring is limited to only when an object is being dragged.

In some embodiments, once the drag operation is detected, an invisible window (e.g., invisible window 210) may be temporarily created. An area of the invisible window may be defined by the threshold distance from the system tray icon (e.g., system tray icon 208). In this example, the listening for the drag operation helps prevent unnecessarily blocking the area behind the invisible window when a drag operation is not occurring. As shown in FIG. 2A, invisible window 210 may block the area behind it, and icon 212 that is located behind invisible window 210 may consequently be inaccessible when invisible window 210 is open.

Additionally, the threshold distance may be adjusted by a user or system 100 to be any distance for any other chosen aspect shown at the graphical user interface. Similarly, the invisible window may also have adjustable parameters to change the threshold distance.

Figure 2B:
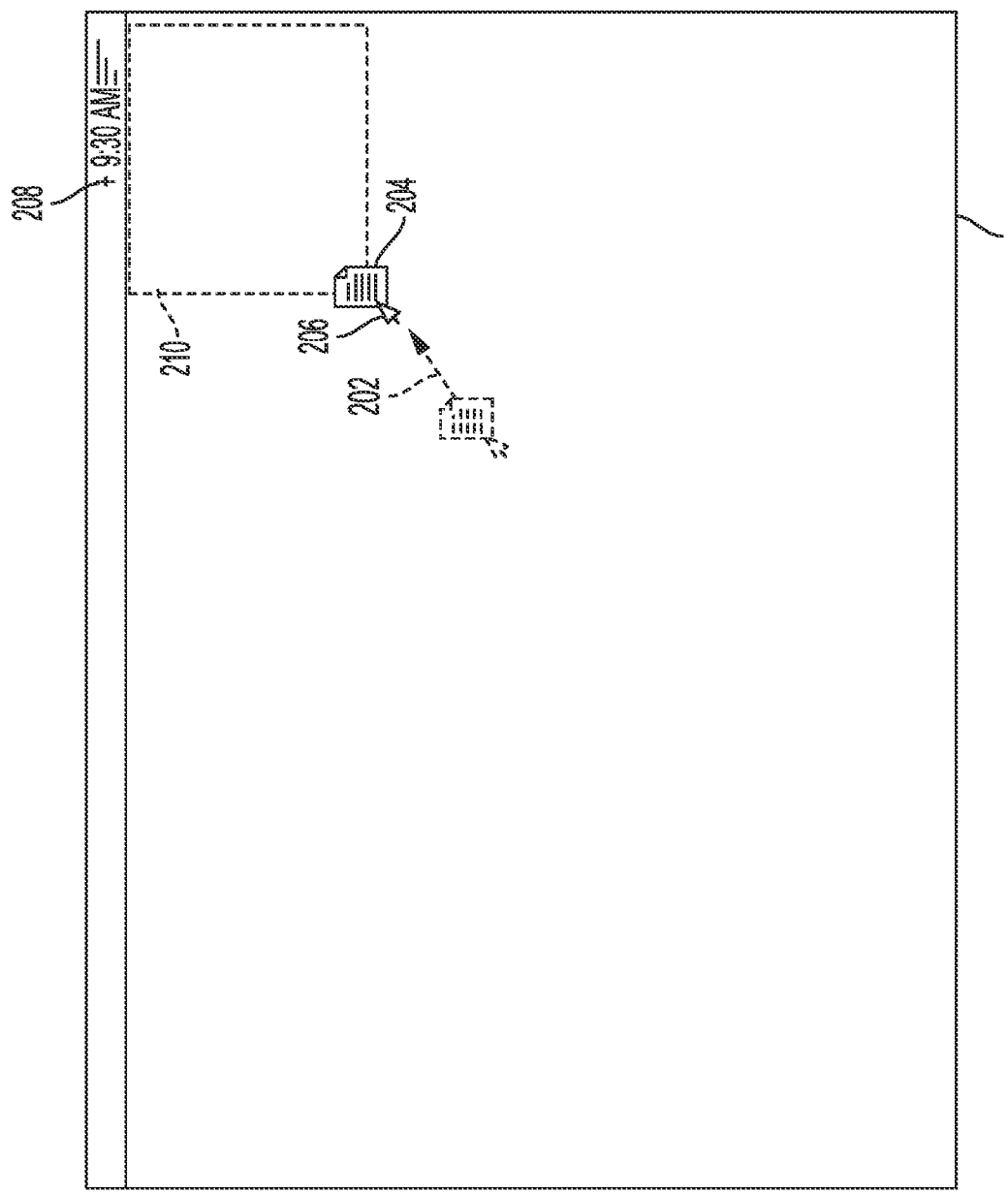
FIG. 2B shows an example user interface where a pointer performing the drag operation comes within a threshold distance of a system tray icon, in accordance with some aspects of the present technology.

FIG. 2B shows graphical user interface 200B displaying pointer 206 dragging content item 204 being within the threshold distance, which may be detected by or in association with the invisible window. Once the pointer 206 dragging the content item 204 is detected to be within the threshold distance, a presentation of a menu window (e.g., menu window 314 in FIGS. 3A and 3B) displaying a menu of options may be triggered.

Figure 3A:
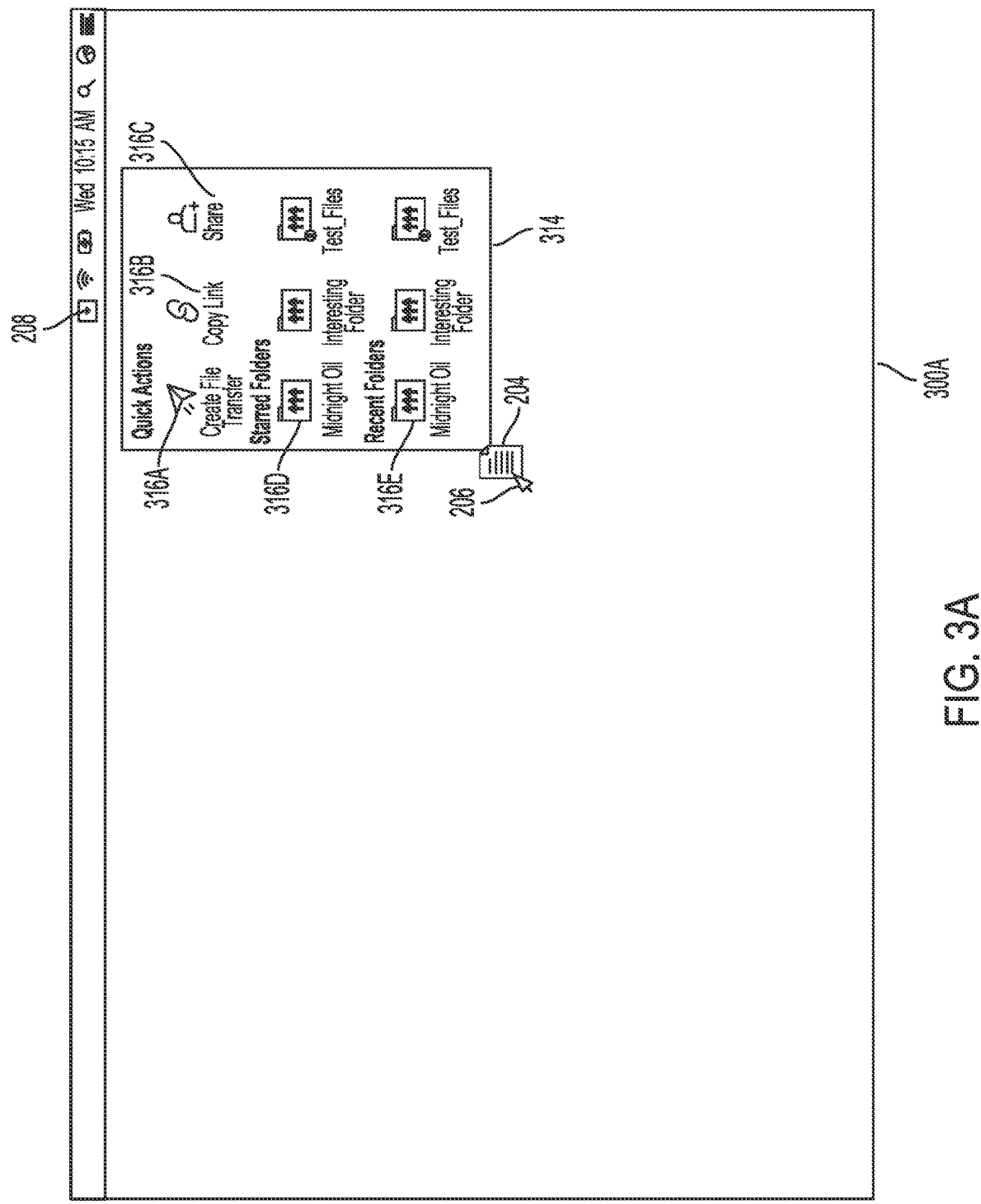
FIG. 3A shows an example user interface for providing a menu of options in response to detecting the pointer coming within the threshold distance, in accordance with some aspects of the present technology.

FIG. 3A shows graphical user interface 300A with menu window 314 that is presented when content item 204 is dragged within a threshold distance of system tray icon 208. The menu of options may include one or more icons (e.g., icon 316A, icon 316B, etc. . . . ) or other indicia that represent various actions and/or workflow options, as shown in example graphical user interface 300A.

For example, one action (e.g., associated with icon 316A) may be to create a file transfer of the object (e.g., content item 204). Another action (e.g., associated with icon 316B) may be to copy a link to the object, where the link is associated with accessing the object after it is stored at content management system 110. If the dragged object were not already stored at content management system 110, the action may also include uploading the object into content management system 110 before creating and/or copying a link to the object.

Another action (e.g., associated with icon 316C) may be to display a submenu of options for contacts or groups to which the object can be shared. Alternatively or in addition, frequent contacts or groups to whom objects have been frequently shared may be associated with icons or indicia, be shown in a list form, and/or shown as a face pile in menu or a submenu.

Another action may be to add the object into a starred folder (e.g., associated with icon 316D) or a recently used folder (e.g., associated with icon 316E).

In some examples, contacts, groups, folders, or any other icons for object actions that are presented at menu window 314 may be determined and surfaced based on various rules and/or artificial intelligence (AI). In some embodiments, the rules and/or AI may take the data and metadata associated with the object into consideration when determining what menu items to surface. For example, if the object is a content item that has been edited by certain user accounts, then indicia for those user accounts may show up in menu window 314.

In some examples, if a certain user account of content management system 110 has indicated a request for work product, that certain user account may show up in menu window 314. Such a determination may be made based on internal communications from the certain user account within content management system 110. Alternatively or in addition, a third-party application programming interface (API) that ties an email service to content management system 110 may determine that the user of the certain user account has requested for work product based on a associated user account at the email service.

Menu window 314 may also include any commonly-used action workflows determined as possible actions the user may want to actuate on the object. Some of the workflows may be performed by third-party services such as third-party workflow or task management services, such as Trello®.

Figure 3B:
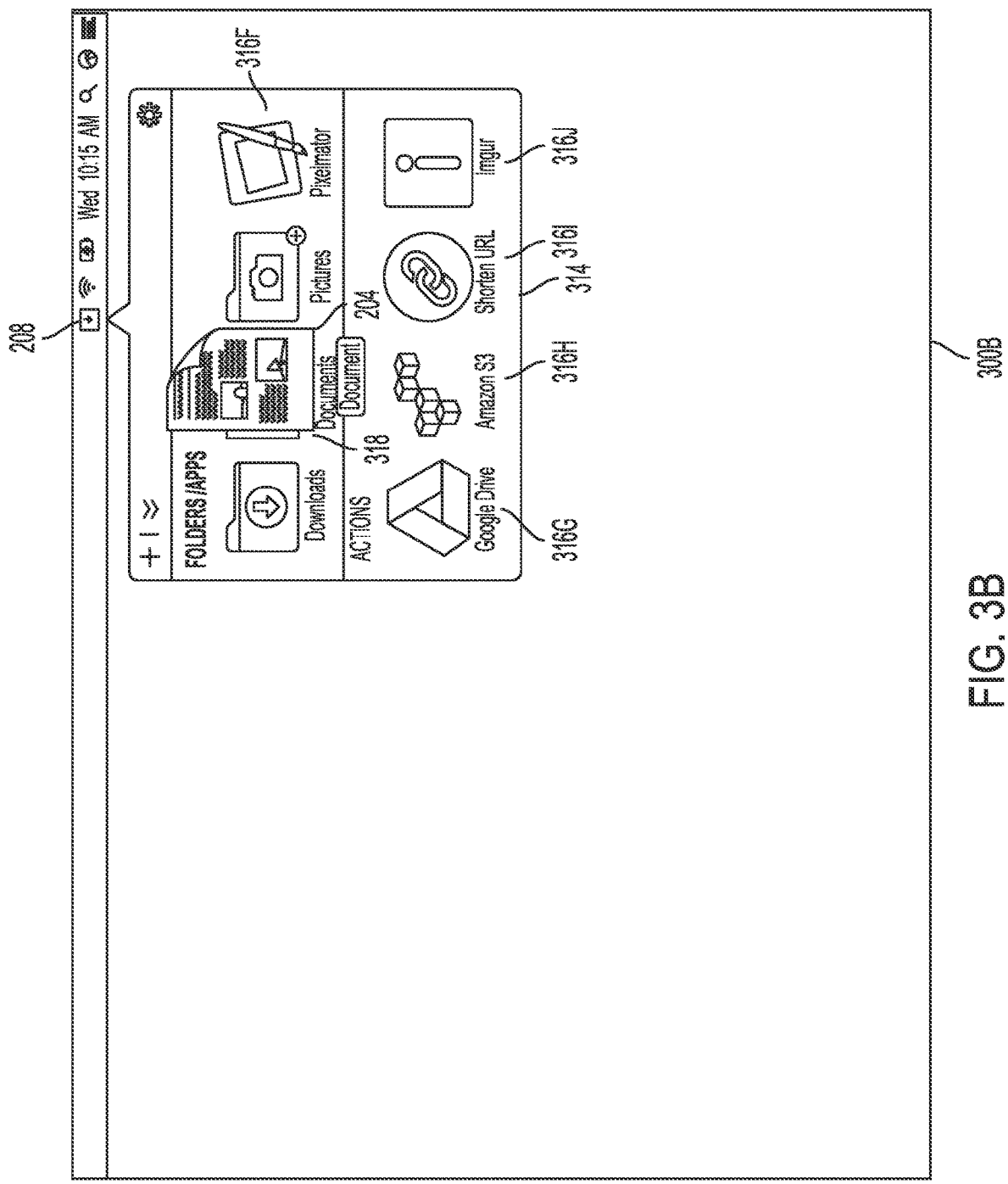
FIG. 3B shows an example user interface for providing a menu of options from the system tray icon and selecting a chosen icon, in accordance with some aspects of the present technology.

Other actions may be associated with third-party services, such as Imgur®, Pixelmator®, Google Drive®, and Amazon S3®. FIG. 3B shows graphical user interface 300B having a menu window 314 with icons related to actions that can be performed with respect to third-party tools. The other actions may specifically perform, for example, shortening a URL for a link to the object (see icon 316I), converting the object into a different format (see icon 316F), or uploading the object to a third-party service (see icons 316G, 316H, 316J). In some examples, the object may already be stored at content management system 110, such that an API that connects content management system 110 and a third-party service may perform such an upload, or the object may need to be added to content management system 110 first.

Once a drop operation has been detected upon a chosen icon (e.g., chosen icon 318), an associated action or workflow for the chosen icon may be initiated with respect to the dragged object. The drop operation may be detected by the window. The drop operation includes unselecting the selected object such that the pointer 206 releases the selection of the object and the object is dropped at the location of the pointer 206.

Figure 4A:
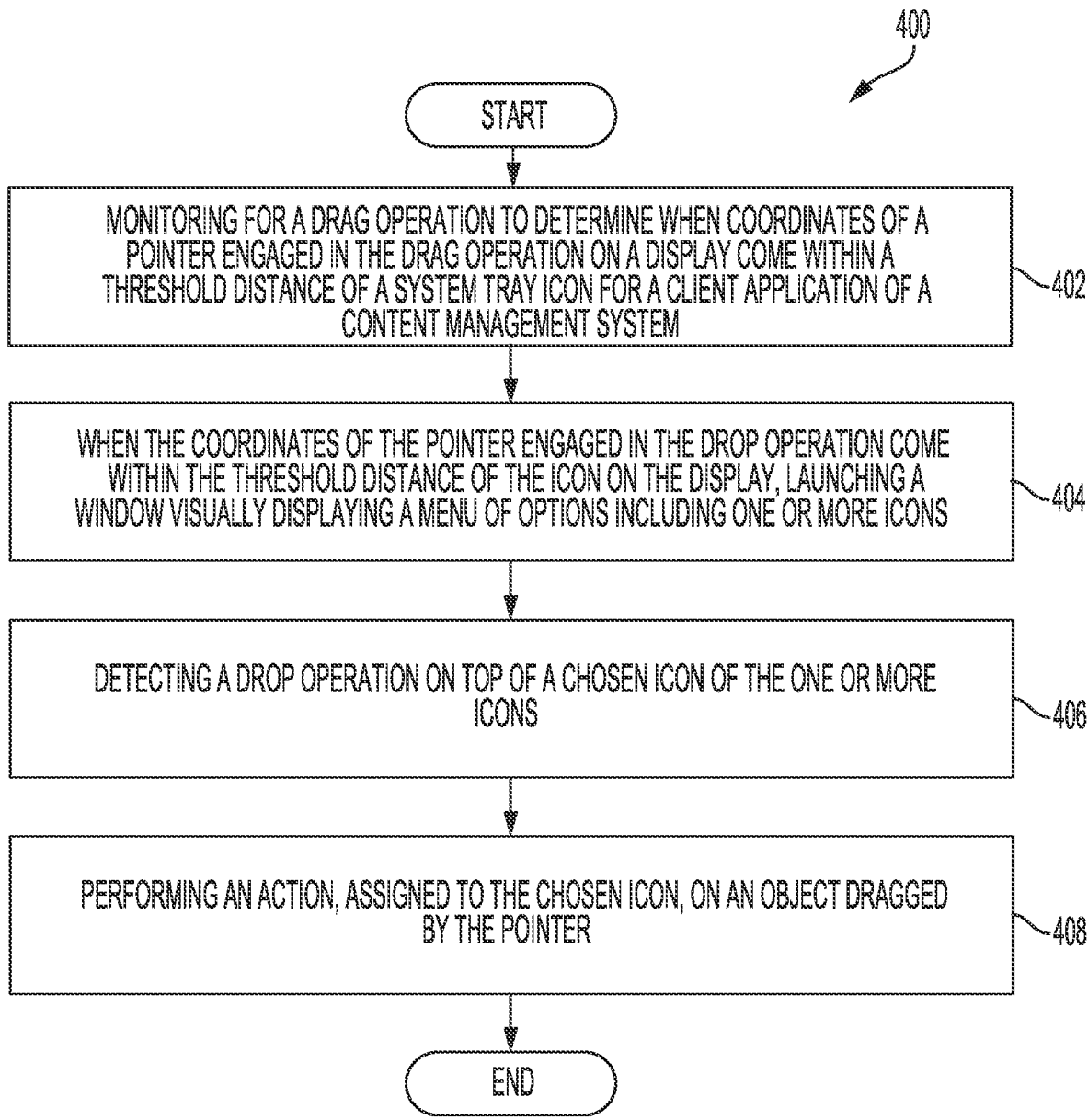
FIG. 4A shows an example method embodiment for monitoring for a drag operation of one or more objects to initiate an action associated with a content management system, in accordance with some aspects of the present technology.
Figure 4B:
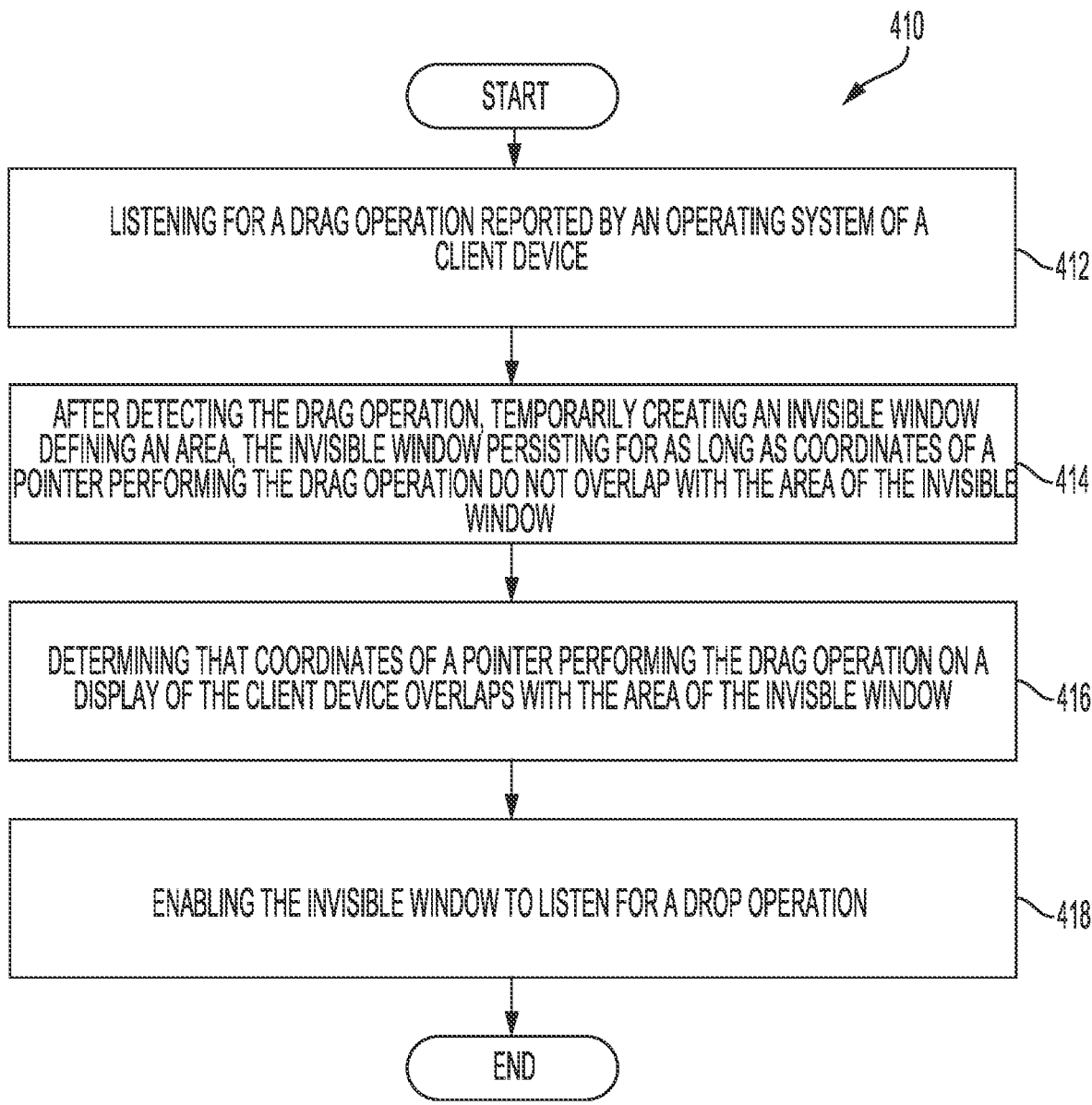
FIG. 4B shows another example method embodiments for listening for a drag operation of an object to initiate an action associated with a content management system, in accordance with some aspects of the present technology.

FIGS. 4A and 4B illustrate example methods 400 and 410, respectively, for providing a menu of options for actions to be performed on a dragged object, according to some aspects of this disclosure. The methods illustrated in FIGS. 4A and 4B should not be limited by aspects depicted in the graphical user interfaces 200A, 200B, 300A, and 300B illustrated in FIGS. 2A, 2B, 3A, and 3B, respectively, and likewise aspects of FIGS. 2A, 2B, 3A, and 3B should not be limited by the methods illustrated in FIGS. 4A and 4B.

FIG. 4A illustrates an example method 400 for displaying and initiating actions and workflows for objects with a single drag-and-drop operation in association with content management system 110. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes monitoring a drag operation (e.g., drag operation 202) to determine when coordinates of a pointer (e.g., pointer 206) on a display come within a threshold distance of a system tray icon (e.g., system try icon 208) for the content management system client application 152 at block 402. For example, the processor 510 illustrated in FIG. 5, client application 152 illustrated in FIG. 1, and/or quick actions service 136 illustrated in FIG. 1 may monitor the drag operation to determine when coordinates of the pointer on the display come within the threshold distance of the system tray icon for the content management system client application 152. Graphical user interfaces 200A, 200B, 300A, 300B illustrates examples of the display at client device 150.

According to some examples, the method includes detecting the coordinates of the pointer engaged in the drag operation to have come within the threshold distance. According to some examples, the method includes, when the coordinates of the pointer come within the threshold distance of the system tray icon, launching a menu window (e.g., menu window 314) displaying one or more icons in a menu of options in block 404. The launching may have been in response to the detecting that the coordinates have come within the threshold distance. For example, the processor 510 illustrated in FIG. 5, client application 152 illustrated in FIG. 1, and/or quick actions service 136 illustrated in FIG. 1 may detect the coordinates and/or launch the menu window in block 404.

According to some examples, the monitoring for the drag operation may include listening for the drag operation that is reported by an operating system of client device 150. According to some examples, after detecting the drag operation, an invisible window (e.g., invisible window 210) may be temporarily created, having parameters defined by the threshold distance from the system tray icon. According to some examples, the coordinates of the pointer may be detected to be overlapping with the coordinates of the area of the invisible window, such that the launching of block 404 may be in response to the detecting that the coordinates are overlapping with the area of the invisible window.

According to some examples, the method includes detecting a drop operation on top of a chosen icon (e.g., chosen icon 318) of the one or more icons in block 406. According to some examples, the method includes performing an action, assigned to the chosen icon, on an object (e.g., content item 204) dragged by the pointer in block 408. For example, the processor 510 illustrated in FIG. 5, client application 152 illustrated in FIG. 1, and/or quick actions service 136 illustrated in FIG. 1 may detect the drop operation in block 406 and/or performing the action in block 408.

In some embodiments, the action assigned is to present a submenu associated with the chosen icon, and upon the detecting of drop operation in block 406, the submenu of options may be displayed. The submenu of options may be displayed in a new window that is displayed over and obscure at least a portion of the menu window. Alternatively, the submenu may be displayed in the same menu window. Also, the drop operation may be detected with respect to a second icon of the submenu of options, and an action associated with the second icon may be performed.

In some embodiments, the chosen icon may indicate a particular location in content management system 110 and the action may result in adding the object to the particular location. The object does not need to already be stored at content management system 110. In some embodiments, the action is associated with a workflow of steps that are performed to complete the action. For example, if the object is not already stored at content management system 110, a first step may be to add the object into content management system 110 and a second step may be to move the object to the particular location.

In some embodiments, after or if the object is stored at content management system 110, the action may be a workflow that may be performed by a third-party workflow or task management services, such as TRELLO®. In some embodiments, if the object is not yet stored at content management system 110, the action may be queued for later performance, waiting for the object to be stored at content management system 110, and then performing the action to the object that has been stored at content management system 110.

The one or more icons may also include frequently accessed folders and flagged/starred folders. The actions associated may include saving and synchronizing the object saved in a selected frequently accessed folder or flagged/starred folder. Alternatively, the actions associated may include uploading the object to content management system 110 to be stored in the selected frequently accessed folder or flagged folder, and then synchronizing the object saved. A copy of the object may be saved at client device 150 and/or content management system 110.

In some embodiments, the chosen workflow may include creating a sharable URL to the object at content management system 110, such as that for icon 316C (refer to FIG. 3A), for example. In some embodiments, the chosen workflow may include storing the link to a clipboard, such as that for icon 316C (refer to FIG. 3A), for example. In some embodiments, the chosen workflow may include emailing the object and/or sending the object to a signature service for signing. In some embodiments, the chosen workflow may include transferring the object to a contact. When it comes to particular contacts of interest, the chosen icon may indicate a particular contact or group. The one or more icons may include frequently-used contacts or groups that are display in a list or in a facepile. The actions associated with contacts and groups may include sending the object to one or more of those contacts.

FIG. 4B illustrates an example method 410 for displaying and initiating actions for objects with a single drag-and-drop operation in association with content management system 110. Although the example method 410 depicts a particular sequence of operations, the sequence may be altered without departing from the scope of the present disclosure. For example, some of the operations depicted may be performed in parallel or in a different sequence that does not materially affect the function of the method 410. In other examples, different components of an example device or system that implements the method 410 may perform functions at substantially the same time or in a specific sequence.

According to some examples, the method includes listening for the drag operation (e.g., drag operation 202) of an object, which may be reported by an operation system of client device 150 in block 412. According to some examples, the method includes, after detecting the drag operation, temporarily creating an invisible window (e.g., invisible window 210) that defines an area in block 414. For example, the processor 510 illustrated in FIG. 5, client application 152 illustrated in FIG. 1, and/or quick actions service 136 illustrated in FIG. 1 may listen for the drag operation in block 412 and/or temporarily creating the invisible window in block 414.

The invisible window may persist for as long as coordinates of a pointer (e.g., pointer 206) performing the drag operation do not overlap with the area of the invisible window. According to some examples, the method includes determining that the coordinates of the pointer overlap with the area of the invisible window in block 416. According to some examples, the method includes enabling the invisible window to listen for a drop operation in block 418. For example, the processor 510 illustrated in FIG. 5, client application 152 illustrated in FIG. 1, and/or quick actions service 136 illustrated in FIG. 1 may determine that the coordinates of the pointer overlap in block 416 and/or enable the invisible window to listen for the drop operation in block 418.

In some embodiments, the drag operation may be determined to have terminated outside of the area of the invisible window, causing the invisible window to be removed, disappear, or terminated. In some embodiments, the coordinates of the pointer, performing the drag operation, are determined to overlap with the area of the invisible window such that a menu window is launched or the invisible window becomes visible. Furthermore, the invisible window and any resulting visible menu may subscribe to listen to operating system drop events to learn when and where a drop occurs. For example, the processor 510 illustrated in FIG. 5, client application 152 illustrated in FIG. 1, and/or quick actions service 136 illustrated in FIG. 1 may determine that the drag operation terminated outside of the area, determine that the coordinates of the pointer overlap the area, and/or subscribe to listen to operating system drop events.

The menu window may stem from a system tray icon (e.g., system tray icon 208). The menu window may include one or more icons that represent one or more actions or workflows to perform on the object. Alternatively, after determining that the coordinates of a pointer overlap with the area of the invisible window, the invisible window (e.g., invisible window 210 in FIG. 2B) may change into a visible menu of options (see menu window 314 in FIG. 3A). Consequently, the visible menu of options may include one or more icons that represent one or more actions or workflows to perform on the object.

Figure 5:
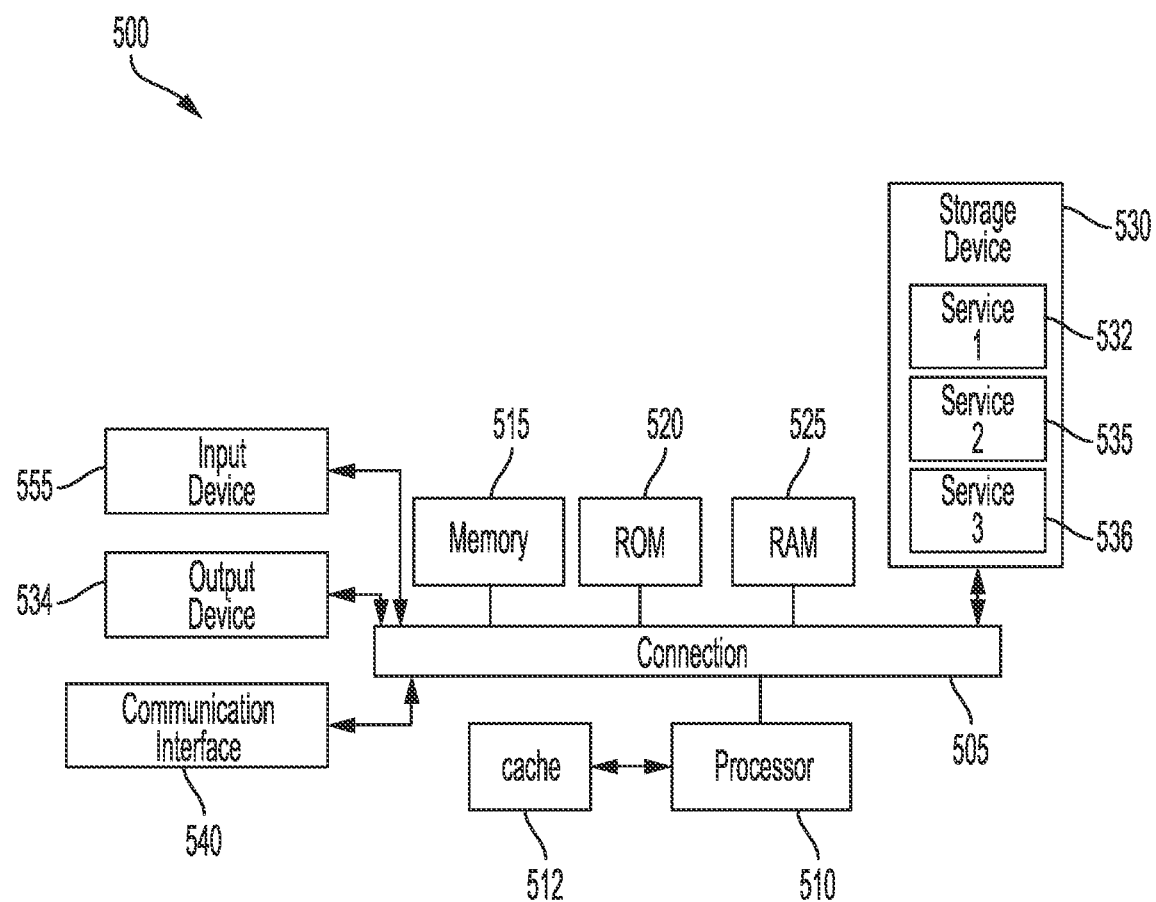
FIG. 5 shows an example of a system for implementing some aspects of the present technology.

FIG. 5 shows an example of computing system 500, which can be, for example, any computing device making up client device 150, content management system 110, quick actions service 136 or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 535, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 555, which can represent any number of input mechanisms, such as a microphone for speech, a touch-sensitive screen for gesture or graphical input, keyboard, mouse, motion input, speech, etc. Computing system 500 can also include output device 534, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 534, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method performed by a content management system client application comprising:
   monitoring for a drag operation to determine when coordinates of a pointer engaged in the drag operation on a display come within a threshold distance of a system tray icon for a client application of a content management system;
   when the coordinates of the pointer engaged in the drag operation come within the threshold distance of the system tray icon on the display, launching a window displaying one or more icons in a menu of options;
   detecting a drop operation on top of a chosen icon of the one or more icons;
   performing an action, assigned to the chosen icon, on an object dragged by the pointer;
   storing the object at the content management system; and
   after storing the object, associating a workflow corresponding to the action with the object, wherein the workflow includes at least one step performed by the content management system.

2. The computer-implemented method of claim 1, wherein the chosen icon indicates a particular location in the content management system, the action adding the object to the particular location.

3. The computer-implemented method of claim 1, wherein the performing the action comprises:
   queuing the action for later performance;
   storing the object at the content management system; and
   performing the action after the object has been stored at the content management system.

4. The computer-implemented method of claim 1 comprising:
   after detecting the drag operation being reported by an operating system of a client device, temporarily creating an invisible window with an area defined by the threshold distance from the system tray icon; and
   enabling the invisible window to detect for the pointer coming within coordinates of the area of the invisible window.

5. The computer-implemented method of claim 4, comprising:
   detecting that the coordinates of the pointer engaged in the drag operation are overlapping with coordinates in the area of the invisible window, wherein the launching the window displaying the one or more icons in the menu of options is in response to the detecting that the coordinates of the pointer engaged in the drag operation are overlapping with some coordinates in the area of the invisible window.

6. The computer-implemented method of claim 1, comprising:
   determining that the action that is assigned to the chosen icon is to present a submenu; and
   displaying the submenu of options.

7. The computer implemented method of claim 1, wherein the associating a workflow corresponding to the action is automatically performed after the storing of the object in the content management system.

8. A content management system comprising:
   one or more processors; and
   a non-transitory computer-readable medium storing instructions that, when executed by the one or more processors, cause the one or more processors to:
      monitor for a drag operation to determine when coordinates of a pointer engaged in the drag operation on a display come within a threshold distance of a system tray icon for a client application of the content management system;
      when the coordinates of the pointer engaged in the drag operation come within the threshold distance of the system tray icon on the display, launching a window displaying one or more icons in a menu of options;
      detect a drop operation on top of a chosen icon of the one or more icons;

perform an action, assigned to the chosen icon, on an object dragged by the pointer;

store the object at the content management system; and after storing the object, associate a workflow corresponding to the action with the object, wherein the workflow includes at least one step performed by the content management system.

9. The content management system of claim 8, wherein the chosen icon indicates a particular location in the content management system, the action adding the object to the particular location.

10. The content management system of claim 8, wherein the performing the action comprises:

queuing the action for later performance;

storing the object at the content management system; and performing the action after the object has been stored at the content management system.

11. The content management system of claim 8, wherein storing instructions that, when executed by the one or more processors, cause the one or more processors to:

after detecting the drag operation being reported by an operating system of a client device, temporarily create an invisible window with an area defined by the threshold distance from the system tray icon; and enable the invisible window to detect for the pointer coming within coordinates of the area of the invisible window.

12. The content management system of claim 11, wherein storing instructions that, when executed by the one or more processors, cause the one or more processors to:

detect that the coordinates of the pointer engaged in the drag operation are overlapping with coordinates in the area of the invisible window, wherein the launching the window displaying the one or more icons in the menu of options is in response to the detecting that the coordinates of the pointer engaged in the drag operation are overlapping with some coordinates in the area of the invisible window.

13. The content management system of claim 8, wherein storing instructions that, when executed by the one or more processors, cause the one or more processors to:

determine that the action that is assigned to the chosen icon is to present a submenu; and display the submenu of options.

14. A non-transitory computer-readable medium storing instructions that, when executed by one or more processors, cause the one or more processors to:

monitor for a drag operation to determine when coordinates of a pointer engaged in the drag operation on a display come within a threshold distance of a system tray icon for a client application of a content management system;

when the coordinates of the pointer engaged in the drag operation come within the threshold distance of the system tray icon on the display, launching a window displaying one or more icons in a menu of options;

detect a drop operation on top of a chosen icon of the one or more icons;

perform an action, assigned to the chosen icon, on an object dragged by the pointer;

store the object at the content management system; and after storing the object, associate a workflow corresponding to the action with the object, wherein the workflow includes at least one step performed by the content management system.

15. The non-transitory computer-readable medium of claim 14, wherein the chosen icon indicates a particular location in the content management system, the action adding the object to the particular location.

16. The non-transitory computer-readable medium of claim 14, wherein the performing the action comprises:

queuing the action for later performance;

storing the object at the content management system; and performing the action after the object has been stored at the content management system.

17. The non-transitory computer-readable medium of claim 14, wherein storing instructions that, when executed by the one or more processors, cause the one or more processors to:

after detecting the drag operation being reported by an operating system of a client device, temporarily create an invisible window with an area defined by the threshold distance from the system tray icon; and enable the invisible window to detect for the pointer coming within coordinates of the area of the invisible window.

18. The non-transitory computer-readable medium of claim 17, wherein storing instructions that, when executed by the one or more processors, cause the one or more processors to:

detect that the coordinates of the pointer engaged in the drag operation are overlapping with coordinates in the area of the invisible window, wherein the launching the window displaying the one or more icons in the menu of options is in response to the detecting that the coordinates of the pointer engaged in the drag operation are overlapping with some coordinates in the area of the invisible window.

19. The non-transitory computer-readable medium of claim 14, wherein storing instructions that, when executed by the one or more processors, cause the one or more processors to:

determine that the action that is assigned to the chosen icon is to present a submenu; and display the submenu of options.

20. The non-transitory computer-readable medium of claim 14, wherein the associating a workflow corresponding to the action is automatically performed after the storing of the object in the content management system.

* * * * *